United States Patent [19]

Futamura

[11] Patent Number: 5,765,496
[45] Date of Patent: Jun. 16, 1998

[54] EMBROIDERY DATA PROCESSING DEVICE AND METHOD

[75] Inventor: Masao Futamura, Nagoya, Japan

[73] Assignee: Brother Kogyo Kabushiki Kaisha, Aichi-ken, Japan

[21] Appl. No.: 950,151

[22] Filed: Oct. 14, 1997

[30] Foreign Application Priority Data

Oct. 14, 1996 [JP] Japan ................. 8-271080

[51] Int. Cl.⁶ .................. D05C 5/06; D05B 21/00
[52] U.S. Cl. .................. 112/475.19; 112/102.5; 112/470.04; 112/445
[58] Field of Search .................. 112/102.5, 103, 112/470.04, 470.06, 475.19, 445; 364/470.09

[56] References Cited

U.S. PATENT DOCUMENTS

| | | | |
|---|---|---|---|
| 5,386,789 | 2/1995 | Futamura et al. | 112/103 X |
| 5,560,306 | 10/1996 | Kyuno et al. | 112/102.5 |
| 5,701,830 | 12/1997 | Muto | 112/102.5 |

*Primary Examiner*—Peter Nerbun
*Attorney, Agent, or Firm*—Kane,Dalsimer,Sullivan, Kurucz, Levy, Eisele and Richard, LLP

[57] ABSTRACT

Provided is a method of changing an embroidering order of a plurality of embroidering areas. According to the method, a selected embroidering area and the other areas are displayed on a display in different displaying conditions. With a certain operation, the selected embroidering area changes sequentially, in accordance with the assigned embroidering order. The embroidering order of the currently selected embroidering area can be changed with an operation of a mouse, and the change of the embroidering order is reflected on the displaying condition of embroidering areas.

22 Claims, 7 Drawing Sheets

FIG. 3
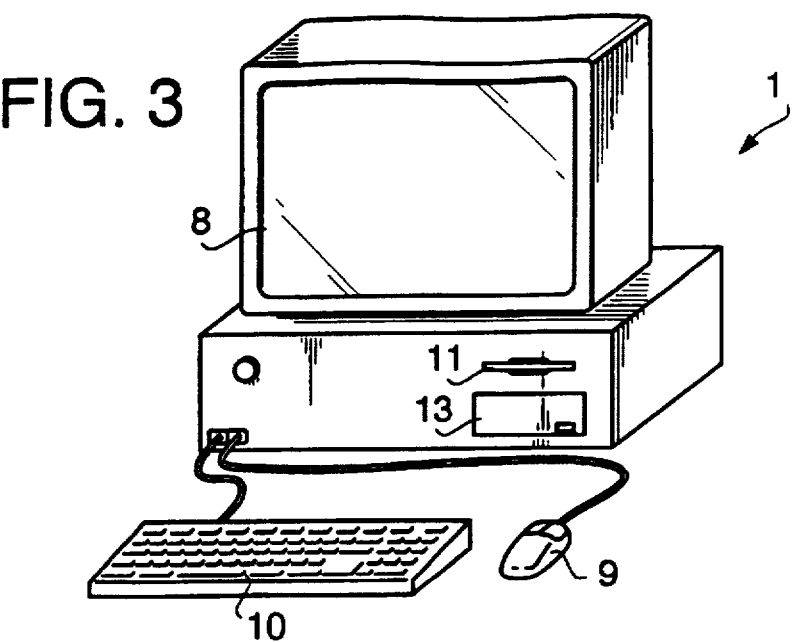
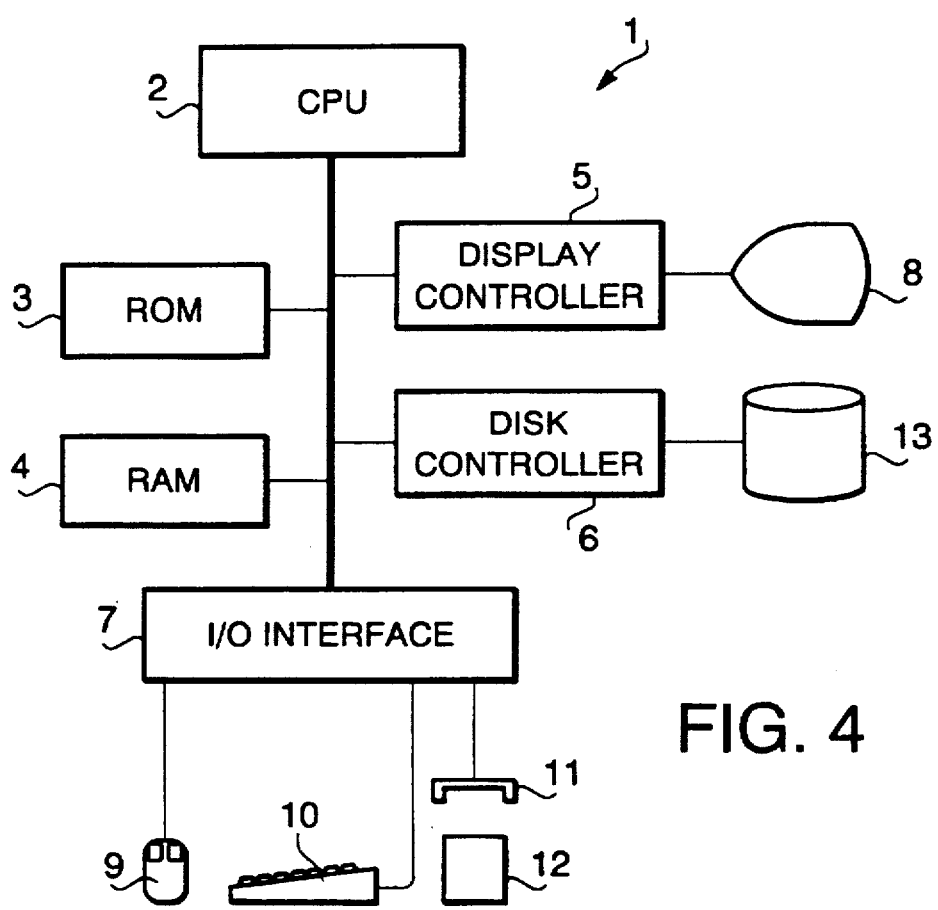
FIG. 4

EMBROIDERY DATA PROCESSING DEVICE AND METHOD

BACKGROUND OF THE INVENTION

The present invention relates to an embroidery data processing device for processing embroidery data representative of a plurality of embroidering areas, and particularly, to an embroidery data processing device which is capable of changing an embroidering order assigned to the plurality of embroidering areas.

Conventionally, in a field of industrial sewing machines, an embroidery data processing device which is provided with a micro-computer and is capable of processing embroidery data having high precision within a relatively short period of time is known. In such an embroidery data processing device, when embroidery data is generated based on an original picture pattern (i.e., a desired image), the following processing is executed.

Firstly, the original picture pattern is divided into groups having the same colors, and the embroidery data is created such that the areas having the same color are embroidered successively. This process is repeated for each color. The picture pattern for the embroidery data is input in the processing device by tracing the original with use of a tablet. Alternatively, the original may be scanned by a scanner, displayed on a monitor device, and then the displayed image is traced with a mouse or the like.

If the embroidering area is a linear area extending as a thin elongated path, a zigzag stitch or a line stitch is assigned to the area; and if the area is a two-dimensional area having a certain area, a satin stitch or a Tatami stitch is assigned to the area.

Creation of the embroidery data according to a conventional method is described in more detail with reference to FIG. 1. In this example, the original picture pattern has six embroidering areas R0–R5, and the following embroidering attribution is assigned to each area.

R0: a red thread, a Tatami stitch;

R1: a black thread, a satin stitch;

R2: a yellow thread, a satin stitch;

R3: a green thread, a Tatami stitch;

R4: a green thread, a Tatami stitch; and

R5: a black thread, a zigzag stitch.

Assignment of an embroidering attribution to an embroidering area is performed such that an embroidering attribution is determined first, and then an outline of a desired area to which the determined attribution is assigned is input by tracing a path through the tablet or the mouse as described above. This processing is repeated for each embroidering area. Finally, the input embroidering areas are displayed as a color image on a display of the data processing device, as shown in FIG. 2. (In FIG. 2, different colors are indicated with different hatching patterns.) Note that, in the conventional embroidery data processing device, the order in which the outlines of the embroidering areas are input corresponds to the order in which the embroidering areas are embroidered.

It is not advantageous that the order of embroidering areas is determined in accordance with the order of inputting the outline data. When the embroidering order is determined, it is preferable to take the following into account: that is, a thread bridging between embroidered areas is to be as short as possible, or is made easy to be cut; and small areas should be prevented from being covered by wide areas.

Therefore, it is important that the order of embroidering can be changed in the embroidery data processing device, after the outlines of the embroidering areas have been input in a certain order. This feature is particularly important when the embroidery is complicated and includes a large number of embroidering areas.

In a conventional embroidery data processing device, when the order of the embroidering areas is changed, firstly an embroidering area of which the order is changed is designated, and then the order of the designated area is moved up or down. Further, in the conventional embroidering data processing device, in order to confirm the changed order, a display mode is changed so that each pattern is displayed one by one in accordance with the embroidering order, since it is difficult to recognize the embroidering order when an image of the entire embroidery is displayed.

In order to assign a desired order to the embroidering areas, the above-described designation of an embroidering area, changing of the order, and changing a display mode to confirm the order of the embroidering areas, should be done every time when the change is made. If the number of embroidering areas is relatively large, the above procedure is troublesome, and accordingly to create and edit the embroidery data was a very time consuming work.

SUMMARY OF THE INVENTION

It is therefore an object of the invention to provide an improved embroidery data processing device which enables changing of embroidering order and confirmation thereof without changing a display mode.

For the object, according to the invention, there is provided a method of processing embroidery data indicative of a plurality of embroidering areas, a predetermined embroidering order being assigned to said plurality of embroidering areas, the method comprising the steps of: selecting a currently selected area from the plurality of embroidery areas; displaying the plurality of embroidering areas except the currently selected area in a first displaying condition; displaying the currently selected area in a second displaying condition; and changing an embroidering order assigned to the currently selected area.

According to the method, an embroidering area can be selected easily, and further, the embroidering order of the selected embroidering area can be changed easily.

Optionally, the step of selecting selects an area of the plurality of embroidering areas one by one in accordance with the embroidering order when an operable member is operated. Therefore, the changed embroidering order can be recognized easily, without changing the operation mode of an embroidering data processing device. Only by operating the operable member, the embroidering area is sequentially selected, and the embroidering order of the selected embroidering area can be changed easily.

Further optionally, the first and second displaying conditions are different in pattern. Alternatively or optionally, the first and second displaying conditions may be different in color. Further alternatively, the first and second displaying conditions may be different in at least one of displayed pattern and displayed color.

Still optionally, the step of changing the embroidering order may move the embroidering order of the selected area to a first order, and moves down the embroidering orders of the areas of which orders are earlier than the previous order of the currently selected area by one.

Alternatively or optionally, the step of changing the embroidering order may move down the embroidering order of the selected area to a last order, and moves up the embroidering orders of the areas of which orders are later than the previous order of the currently selected area by one.

Further alternatively or optionally, the step of changing the embroidering order may move up the embroidering order of the selected area by one.

Furthermore, the step of changing the embroidering order may move down the embroidering order of the selected area by one.

Still optionally, the method may include a step of confirming whether changes are to be reflected to the embroidery data. Thus, only when the changes are confirmed, the changes are made effective. In order for making the changes effective, the method further includes a step of updating the embroidery data.

Yet optionally, the method may include a step of canceling the changes having been made by the changing step.

Further optionally, the method may include a step of generating sewing data based on the embroidery data, the sewing data being stored in a recording medium which is readable by a sewing machine.

According to another aspect of the invention, there is provided an embroidery data processing device for processing embroidery data indicative of a plurality of embroidering areas, a predetermined embroidering order being assigned to the plurality of embroidering areas, the embroidery data processing device comprising: means for selecting a currently selected area from the plurality of embroidery areas; first means for displaying the plurality of embroidering areas except the currently selected area in a first displaying condition; second means for displaying the currently selected area in a second displaying condition; and means for changing an embroidering order assigned to the currently selected area.

According to furhter aspect of the invention, there is provided an embroidery data processing device for processing embroidery data indicative of a plurality of embroidering areas, a predetermined embroidering order being assigned to the plurality of embroidering areas, the embroidery data processing device comprising: an embroidery data memory which stores the embroidery data; a display, which displays an image of the plurality of embroidering areas; a designating system including an operable member which is operable by an operator to designate at least one of the plurality of embroidering areas displayed on the display; a controller which differentiates displaying conditions of the at least one of the plurality of embroidering areas, and the other of the plurality of embroidering areas; and an embroidering order changing system which changes an embroidering order assigned to the currently selected area.

According to the embroidering data processing device, an embroidering area can be selected easily, and further, the embroidering order of the selected embroidering area can be changed easily.

Optionally, the designating system designates the at least one of the plurality of embroidering areas one by one in accordance with the embroidering order upon every operation of the operable member. Therefore, the changed embroidering order can be recognized easily, without changing the operation mode of the embroidering data processing device. Only by operating the operable member, the embroidering area is sequentially selected, and the embroidering order of the selected embroidering area can be changed easily.

BRIEF DESCRIPTION OF THE DRAWINGS

FIG. 3 is a schematic perspective view of the embroidery data processing device according to an embodiment of the invention;

FIG. 4 is a block diagram illustrating a control system of the embroidery data processing device;

DETAILED DESCRIPTION OF THE PREFERRED EMBODIMENTS

Figure 1:
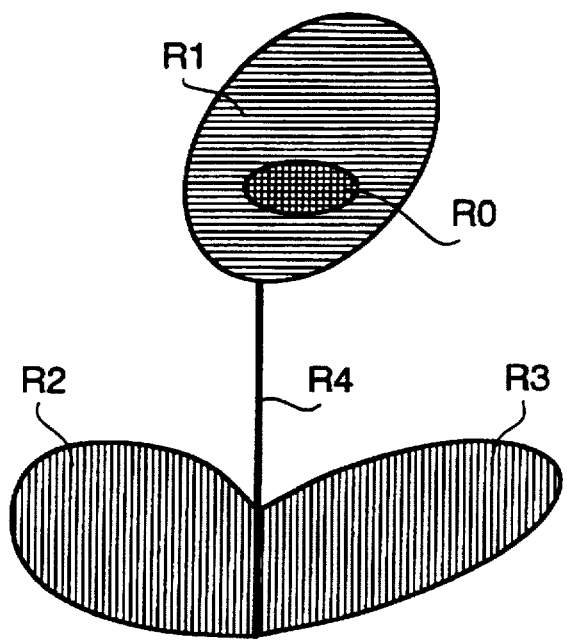
FIG. 1 shows an example of embroidering areas to be processed.
Figure 2:
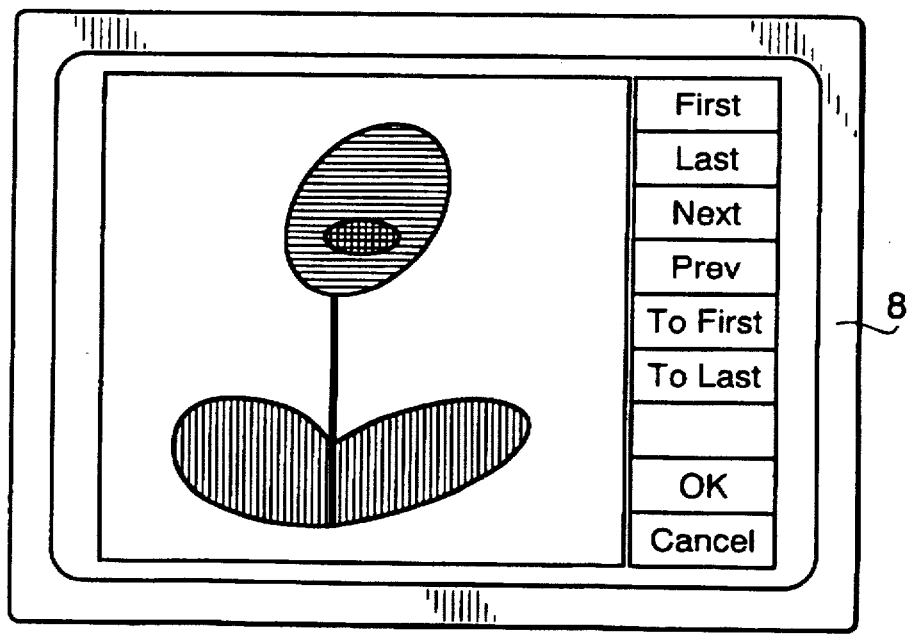
FIG. 2 shows a screen image of a displaying device of the embroidery data processing device.

An embodiment of the present invention will be described with reference to accompanying drawings. It should be noted that FIG. 1 was referred to when the conventional art is described, and the same drawing will be referred to when the embodiment according to the present invention is described.

Firstly, a personal embroidery sewing machine will be described briefly. The embroidery sewing machine is provided with a frame for supporting a cloth on which the embroidery is formed. The frame is located on a sewing machine bed, and movable in X and Y directions which are perpendicular to each other, and are also perpendicular to the moving direction of a needle of the sewing machine. By a moving mechanism, the frame is moved in the X and Y directions while sewing is executed, and a two-dimensional pattern is formed on the cloth.

Generally, the moving mechanism and the needle are controlled to move by a controller which is provided in the sewing machine. Specifically, in accordance with position data of each X and Y stitch, the controller controls the movement of the frame and the needle so that the pattern represented by the data is formed.

The sewing machine is further provided with a flash memory reading device, and capable of reading embroidery data stored in the flash memory. In the embodiment described below, the data to be stored, for example, in the flash memory described above is created.

FIG. 3 shows a schematic perspective view of an embroidery data processing device, and FIG. 4 is a block diagram illustrating a control system of the embroidery data processing device.

The embroidery data processing device 100 has a main body which includes a personal computer having a CPU (Central Processing Unit) 2, a ROM (Read Only Memory) 3, a RAM (Random Access Memory) 4, a display controller 5, a disk controller 6, and an I/O interface 7. The above listed units are all interconnected through a system bus.

The display controller 5 is connected to a displaying device such as a CRT (Cathode Ray Tube) 8 for displaying embroidering patterns, various messages and the like.

The interface 7 is connected to a mouse 9 which is operated by an operator to input a shape of a pattern, various control commands and the like, and a keyboard 10 which is used for inputting alphanumeric characters, operation commands and the like. Further, the interface 7 is connected with a card connector 11 to which a card-shaped flash memory 12 is connected. The flash memory 12 is used for storing the embroidery data processed by the embroidery data processing device.

The disk controller 6 is connected to a hard disk drive 13 which stores programs to be executed by the CPU 2 for operating embroidery data processing, newly created embroidery data and the like.

When the embroidery data processing device is turned ON, a program loader stored in the ROM 3 controls the disk controller 6 to load the programs stored in the hard disk drive 13 into the RAM 4. Then the CPU 2 is ready to execute the loaded programs to perform various embroidery data processing.

In the following description, the embroidery data processing operation is described when embroidery data for the "flower" shown in FIG. 1 is processed, with reference to a flowchart shown in FIG. 5. It is assumed that the embroidery data representing the figure (i.e., the flower) shown in FIG. 1 has been stored in a predetermined area of the RAM 4 as input through the mouse 9, keyboard 10, or from the hard disk drive 13. Note that a mouse pointer is displayed on the display device 8, and by moving the mouse, the displayed mouse pointer is moved on the displaying device 8. When a mouse button is clicked, a button or the like displayed on the displaying device and located at the mouse pointer is designated. Hereinafter, the operation of moving the mouse pointer on the display and clicking the mouse button when the mouse pointer is displayed at a certain point will be referred to as "click the point." For example, when it is described that the operator clicks a button on an OK button, it means the operator moves the mouse pointer on the displayed OK button with use of the mouse, and clicks the mouse button.

Figure 6:
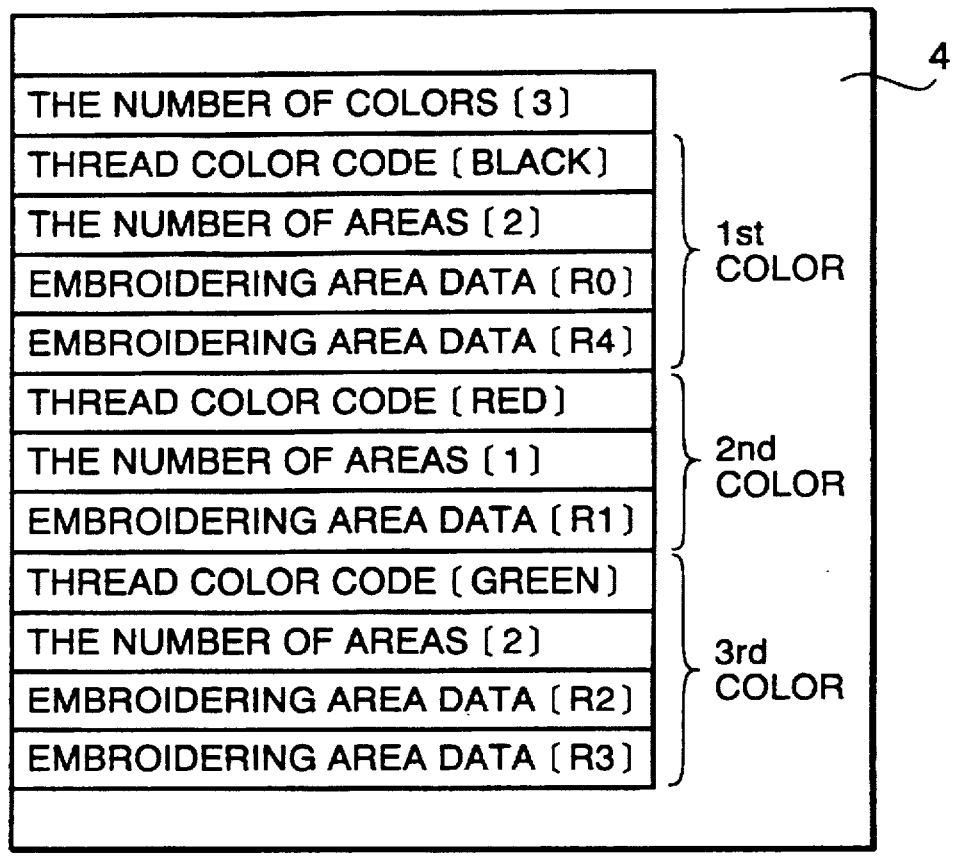
FIG. 6 shows a format of the embroidery data.

FIG. 6 shows a table representing a data structure of the embroidery data for the embroidery (i.e., the flower) shown in FIG. 1. As shown in the table in FIG. 6, the embroidery data includes the number "N" of the colors of threads to be used for the embroidery, and N area data representing embroidering areas for respective colors. Each embroidering area data includes a header data consisting of a thread color code representing a thread color and the number of areas to be embroidered with the color, and a body of the embroidery area data. Each area data contains the number of apexes defining the outer shape of the area, an array of coordinates of the apexes in relation to the frame of the sewing machine, and attribution data representing attribution of stitch (e.g., a type of stitch such as a satin stitch or a Tatami stitch, a density of stitch, a pitch of stitch, a direction of stitch, and the like) assigned to the area.

In the example of FIG. 6, the number N (i.e., black, red and green) of the color equals 3, and the embroidering order of the embroidering areas is (R0, R4, R1, (R2, R3).

When data processing is executed, firstly, the operator is required to change an operation mode to an embroidering order changing mode. To enter this mode, the operator inputs a command through the keyboard 10. Then the embroidery data which is stored in a predetermined area of the RAM 4 is copied into a working area of the RAM 4. Note that change of the data will be applied to the copied data first, and after the changes have been made and confirmed, the changes are reflected to the original data, i.e., the data stored in the predetermined area of the RAM 4 is updated. Further, when the operation mode is changed to the embroidering order changing mode, an initialization process is executed, and a plurality of buttons for inputting commands are displayed on the displaying device 8.

In step S1, the number "n" of the colors of threads, and the selected area number "i" stored in the RAM 4 are set to 3 and −1, respectively. Where, i=−1 means that there is no effective area number (i.e., no areas are currently selected). In step S2, as an initial display, all the embroidering areas are displayed on the display 8 with gray hatching. Note that a plurality of buttons for changing or setting the embroidering order of the embroidering areas are displayed on the same screen of the displaying device 8. These buttons are to be clicked using the mouse.

In step S3, it is determined whether a button is clicked. In the initial stage, no embroidering area number is selected (i.e., i=−1).

Firstly, an operator may click a "First" button or a "Last" button to select the first or the last order embroidering area.

Figure 7A:
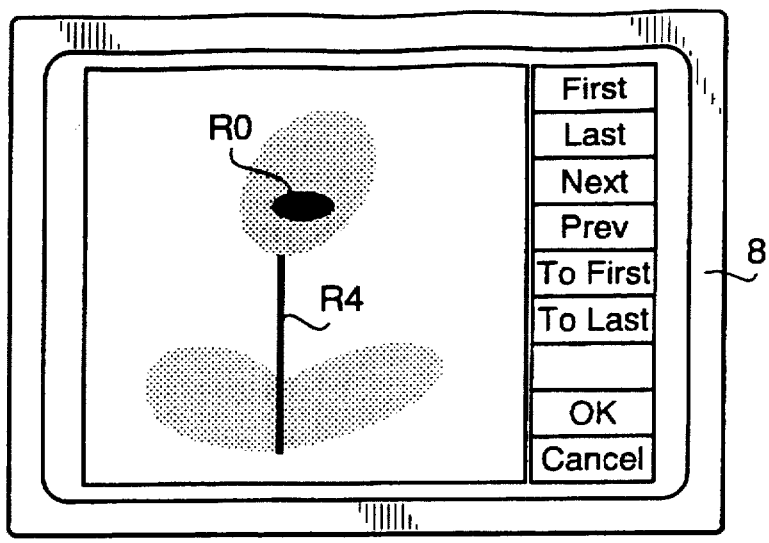
FIGS. 7A–7C show screen images of the displaying device in which various areas are selected.

If the "First" button is clicked (S9:YES), "i" is set to 0 (S18). Thus, the embroidering areas R0 and R4 are selected as the currently selected areas. Then, in S20, the areas R0 and R4 are displayed in black, which is the color of the thread for these areas R0 and R4, and the other areas are displayed with gray hatching as shown in FIG. 7A.

Figure 7B:
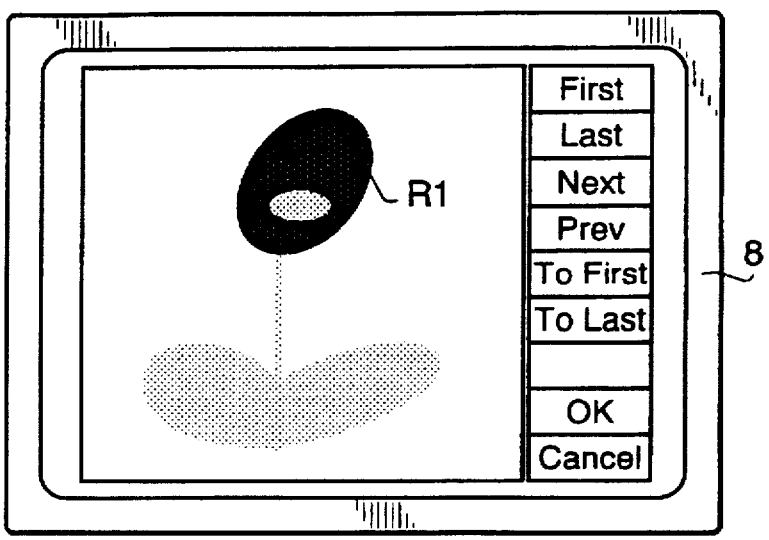
Figure 7C:
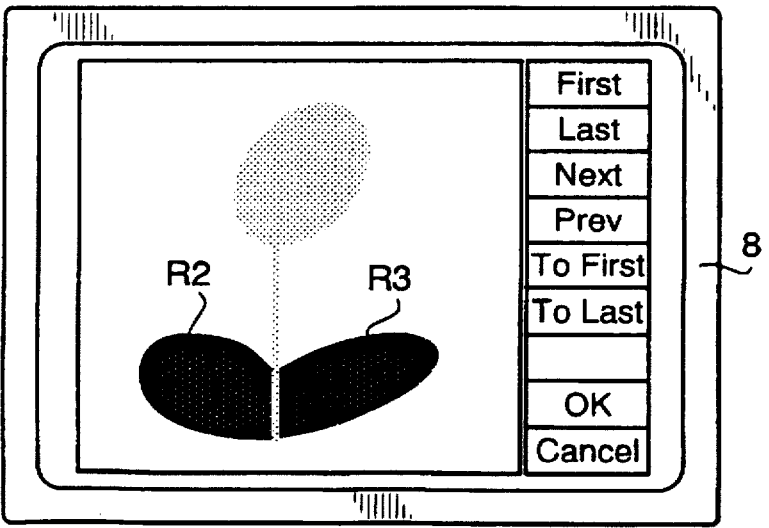

Further, in order to confirm the order of the embroidering areas, a "Next" button is to be clicked. By clicking the "Next" button (S5:YES), "i" is incremented by one (S14), and then at S20, the currently selected areas are changed in response to change of "i", and the areas corresponding to "i" are displayed with the corresponding color. In this case, the areas which do not correspond to "i" are displayed with gray hatching. Change of the color when the above procedure is executed is shown in FIGS. 7A–7C. Note that when "i" equals to 3, i.e., the last order embroidering areas are shown on the displaying device 8 in a color of the corresponding thread, even if the "Next" button is clicked, a condition i<n−1 is not satisfied, and accordingly, the display condition on the displaying device 8 does not change. As a result, as shown in FIG. 7C, the operator can know that the currently displayed areas R2 and R3 are the areas of the last order thread color.

According to the embroidering order in this condition indicated in FIG. 6, after the areas R0 and R4 are embroidered, the area R1 is embroidered. A thread bridging from the area R0 to the area R4 is covered by the area R1, and therefore it is difficult to cut the bridging thread. In order to avoid the above problem, the embroidering order of the areas R0 and R4 are to be changed such that the areas R0 and R4 are embroidered after the area R1 has been embroidered. A procedure for changing the order will be described below.

Firstly, the area R1 is selected to be a currently selected area. For this purpose, a "Prev" button is to be clicked once (S6:YES) when the areas R2 and R3 are selected as the currently selected areas. Then, at S15, "i" is decremented (i.e., changed from 3 to 2), and then at S20, the i-th area, i.e., the area R1 which corresponds to the second order color is displayed on the screen with the corresponding color (i.e., the second color), and the area R1 is set to be the currently selected area (FIG. 7B).

At this stage, if a "To First" button is clicked (S7:YES), the currently selected area, i.e., the area R1 is set to an area to be embroidered firstly (S16). Then, the orders of the other areas of which the embroidering orders are earlier than the previous order of the area R1 are incremented by one. As a result, the order of the embroidering areas are as follows: (R1)≧(R0≧R4)≧(R2–>R3). Where, the areas in a pair of parentheses are embroidered in the same color. The change set above is reflected in the copied data stored in the working area of the RAM 4. When the order is changed to the first order, in S16, "i" is set to zero, and accordingly, the area R1 is displayed in red (S20), and the other areas are displayed with gray hatching.

If the "To Last" button is clicked (S8:YES), the currently selected area, i.e., the area R1 is set to an area to be embroidered last (S17). Then, the orders of the other areas of which the embroidering orders are later than the previous order of the area R1 are decremented by one. As a result, the order of the embroidering areas are as follows: $(R0 \geq R4) \geq (R2 \geq R3) \geq (R1)$. Where, the areas in a pair of parentheses are embroidered in the same color. The change made above is reflected in the copied data stored in the working area of the RAM 4. When the order is changed to the last order, in S17, "i" is set to n−1, and accordingly, the area R1 is displayed in red (S20), and the other areas are displayed with gray hatching.

Figure 5:
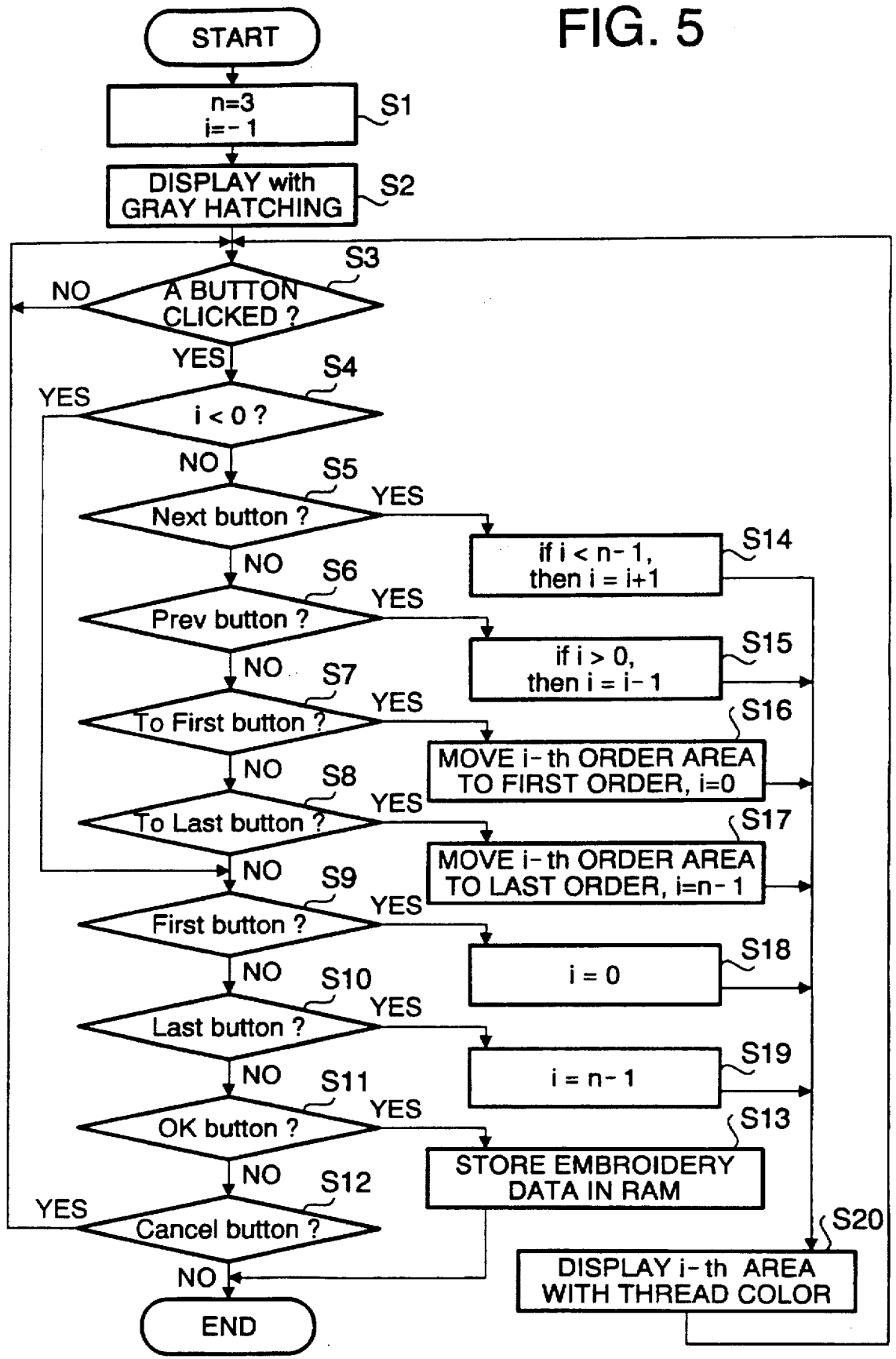
FIG. 5 is a flowchart illustrating embroidering order changing process.

Although it is not shown in FIG. 5, it may be possible to change the embroidering order forward or backward by one step (i.e., to move up or down). In this case, the embroidering order of the currently selected area and the embroidering order of the succeeding or preceding embroidering area are exchanged. A procedure therefor will be described in detail.

If an "OK" button is clicked, the order of the embroidering areas stored in the working area of the RAM 4 is transferred in a predetermined area of the RAM 4 (S13). In other words, the updated data overwrites the embroidery data stored in the predetermined area of the RAM 4. Then, the buttons displayed on the screen disappear, and the embroidering order changing mode is released. Thus, the updated embroidering order becomes effective. It should be noted that if a "Cancel" button is clicked instead of the "OK" button (S12:YES), the embroidery order data stored in the working area of the RAM 4 is not transferred to the predetermined area of the RAM 4, and the embroidering order setting mode is released. In this case, the changes are canceled, and the previous order remains.

In accordance with a predetermined process, the embroidery data edited as above is converted into sewing data, which can be read by a sewing machine, including the stitch data, color data, thread exchange data, list of coordinates of stitching points and the like, and then the sewing data is stored in the flash memory 12.

If the flash memory 12 storing the sewing data is inserted in a sewing machine, the embroidery as shown in FIG. 1 is formed. The sewing machine may display a color exchange instruction and/or the name of the color in accordance with the thread color code stored in the flash memory 12.

According to the embroidery data processing device described above, the embroidering areas are displayed on the displaying device in accordance with the embroidering order, the operator can recognize the order currently assigned, and further can change the order without changing the operation mode of the embroidery data processing device. Accordingly, the embroidery data can be processed easily within a relatively short period of time.

In the above-described embodiment, the order of the currently selected area can be changed to the first-order or the last-order. As described above, it may be possible to change the embroidering order forward or backward by one step (i.e., to move up or down). In this case, the embroidering order of the currently selected area and the embroidering order of the succeeding or preceding embroidering area are exchanged.

A procedure therefor will be described with reference to FIGS. 8 and 9.

Figure 8:
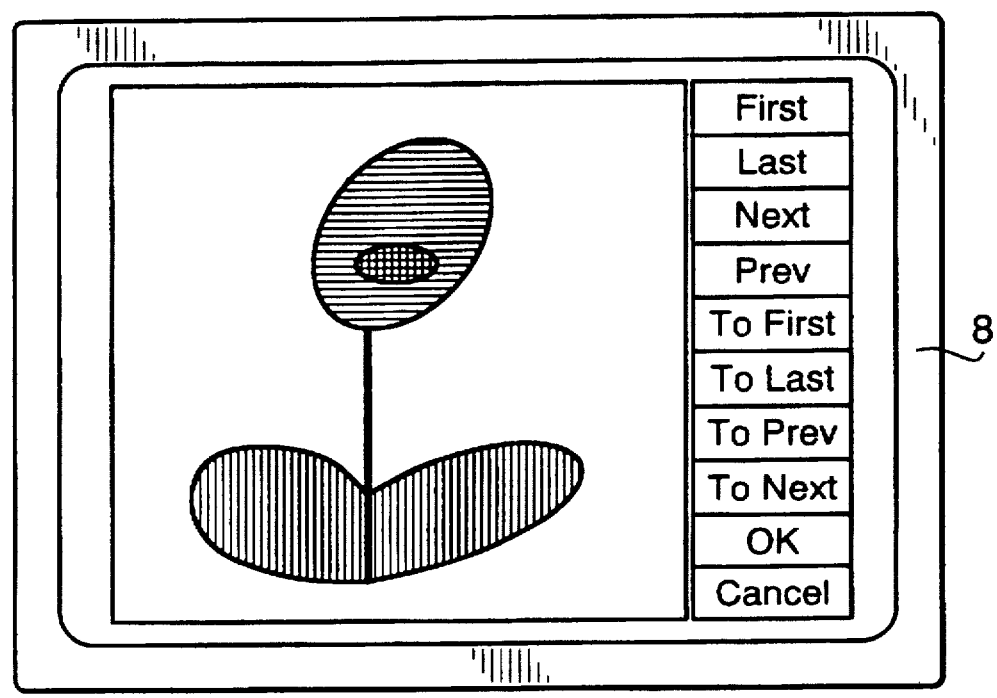
FIG. 8 shows a screen image of a disaplaying device of a modified emboroidery data processing device.

In this modification, as shown in FIG. 8, a "To Prev" button and a "To Next" button are additionally displayed on the display 8. Operations executed when the other buttons area clicked are similar to those in the above-described embodiment, and description thereof in this modification will be omitted.

Figure 9:
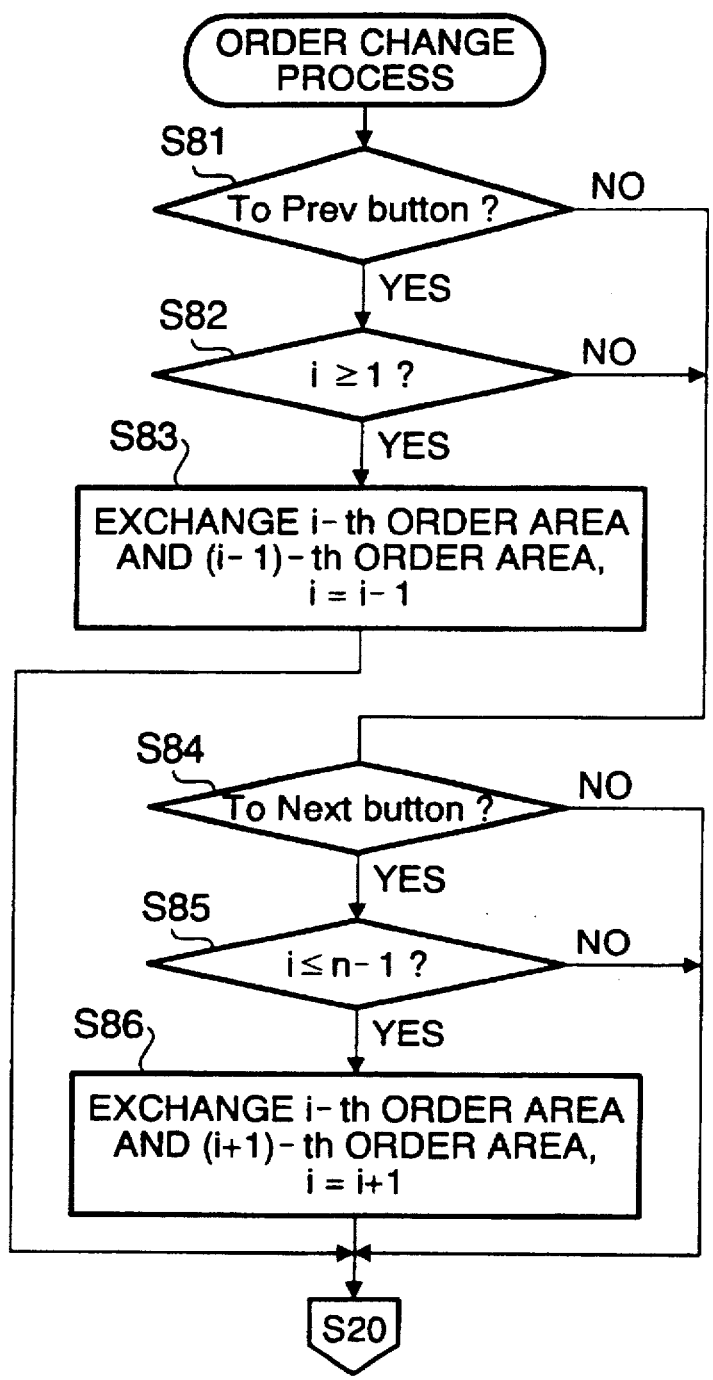
FIG. 9 is a flowchart illustrating an order change process executed in the modified embroidery data processing device.

FIG. 9 is a flowchart illustrating an order change process. As described above, operations when the other buttons area clicked are similar to the above-described embodiment, and therefore the processing shown in FIG. 5 is executed. In this modification, in addition to the processing shown in FIG. 5, the processing shown in FIG. 9 is added, which is to be inserted between steps S10 and S11 in FIG. 5.

At S81 of FIG. 9, it is determined whether the "To Prev" button is clicked. If the clicked button is not the "To Prev" button (NO:S81), control proceeds to S84. If the clicked button is the "To Prev" button (YES:S81), it is determined whether i is greater than or equal to 1 at S82. If i is equal to or greater than 1 (S82:YES), there is at least one area to which the earlier order than the order of the currently selected area is assigned. In this case, the order of the i-th order area (i.e., the currently selected area) and the (i−1)-th order area (i.e., the area to which the previous order is assigned) are exchanged, and then i is changed to i−1 so that the currently selected area remains selected after the order is changed (S83). After the order is changed, control proceeds to S20 of FIG. 5.

If the clicked button is the "To Next" button (NO: S81; YES:S84), it is determined whether i is equal to or less than n−1 at S85. If i is equal to or less than 1 (S85:YES), there is at least one area to which the greater order than the order of the currently selected area is assigned. In this case, the order of the i-th order area (i.e., the currently selected area) and the (i+1)-th order area (i.e., the area to which the next order is assigned) are exchanged, and then i is changed to i+1 so that the currently selected area remains selected after the order is changed (S86) After the order is changed, control proceeds to S20 of FIG. 5.

As above, according to the modified embodiment, the order of an area can be changed to the first or the last, or to a previous or next order, only by clicking an appropriate button. Note that if the order of the currently selected area has reached the first order, even if the "To previous" button is clicked, the order will not be changed. Similarly, if the order of the currently selected area is the last order, even if the "To Next" button is clicked, the order of the area will not be changed.

In the above-described embodiments, the currently selected area is sequentially changed and display condition hereof is also changed by clicking the "Next" button or the "Prev" button. This can be modified such that the display condition changes every predetermined period, for example at every three seconds, in accordance with the embroidering order. In order to change the displayed condition automatically, the CPU 2 measures a time period based on its clock circuit, and executes processing similar to those at steps S14 or S15.

In the above-described embodiments, the currently selected areas are displayed as a color image. If a monochrome display such as a monochrome LCD (Liquid Crystal Display) or the like is used as a displaying device, the currently selected areas may be displayed with a hatching patter which is different from the other areas (i.e., nonselected areas), and/or the selected areas may blink.

In the above-described embodiments, as a recording medium for storing the sewing data, the flash memory is used. However, it is not limited to this example, and alternative medium, such as floppy disk can also be used.

Further, instead of using a recording medium, a communication system (either wired or wireless) can also be used for transmitting the sewing data from the embroidery data processing device to the sewing machine. Furthermore, format of the embroidery data is not limited to the above-described described one, but any type of data, as far as the embroidery areas and the sub-areas can be distinguished, can be used by modifying the process described herein.

Although the data processing device is described as a device separate from a sewing machine, it is also possible to incorporate the data processing device in a sewing machine.

The present disclosure relates to subject matter contained in Japanese Patent Application No. HEI 8-271080, filed on Oct. 14, 1996, which is expressly incorporated herein by reference in its entirety.

What is claimed is:

1. A method of processing embroidery data indicative of a plurality of embroidering areas, a predetermined embroidering order being assigned to said plurality of embroidering areas, the method comprising the steps of:

selecting a currently selected area from the plurality of embroidery areas;

displaying the plurality of embroidering areas except the currently selected area in a first displaying condition;

displaying the currently selected area in a second displaying condition; and changing an embroidering order assigned to the currently selected area.

2. The method according to claim 1, wherein the step of selecting selects an area of the plurality of embroidering areas one by one in accordance with the embroidering order when an operable member is operated.

3. The method according to claim 1, wherein the first and second displaying conditions are different in pattern.

4. The method according to claim 1, wherein the first and second displaying conditions are different in color.

5. The method according to claim 1, wherein the first and second displaying conditions are different in at least one of displayed pattern and displayed color.

6. The method according to claim 1, wherein the step of changing the embroidering order moves the embroidering order of the selected area to a first order, and moves down the embroidering orders of the areas of which orders are earlier than the previous order of the currently selected area by one.

7. The method according to claim 1, wherein the step of changing the embroidering order moves down the embroidering order of the selected area to a last order, and moves up the embroidering orders of the areas of which orders are later than the previous order of the currently selected area by one.

8. The method according to claim 1, wherein the step of changing the embroidering order moves up the embroidering order of the selected area by one.

9. The method according to claim 1, wherein the step of changing the embroidering order moves down the embroidering order of the selected area by one.

10. The method according to claim 1, further comprising a step of confirming whether changes are to be reflected to the embroidery data.

11. The method according to claim 10, further comprising a step of updating the embroidery data when changes having been made are confirmed at the confirming step.

12. The method according to claim 10, further comprising a step of canceling changes having been made by the changing step.

13. The method according to claim 11, further comprising a step of generating sewing data based on the embroidery data, the sewing data being stored in a recording medium which is readable by a sewing machine.

14. An embroidery data processing device for processing embroidery data indicative of a plurality of embroidering areas, a predetermined embroidering order being assigned to said plurality of embroidering areas, said embroidery data processing device comprising:

means for selecting a currently selected area from the plurality of embroidery areas;

first means for displaying the plurality of embroidering areas except the currently selected area in a first displaying condition;

second means for displaying the currently selected area in a second displaying condition; and means for changing an embroidering order assigned to the currently selected area.

15. An embroidery data processing device for processing embroidery data indicative of a plurality of embroidering areas, a predetermined embroidering order being assigned to said plurality of embroidering areas, said embroidery data processing device comprising:

an embroidery data memory which stores said embroidery data;

a display, which displays an image of said plurality of embroidering areas;

a designating system including an operable member which is operable by an operator to designate at least one of said plurality of embroidering areas displayed on said display;

a controller which differentiates displaying conditions of said at least one of said plurality of embroidering areas, and the other of said plurality of embroidering areas; and an embroidering order changing system which changes an embroidering order assigned to a currently selected area.

16. The embroidery data processing device according to claim 15, wherein said designating system designates said at least one of said plurality of embroidering areas one by one in accordance with said embroidering order upon every operation of said operable member.

17. The embroidery data processing device according to claim 15, wherein said displaying conditions are different in at least one of a displayed pattern and displayed color.

18. The embroidery data processing device according to claim 15, wherein said embroidering order changing system moves the embroidering order of the selected area to a first order, and moves down the embroidering orders of the areas of which orders are earlier than the previous order of the selected area by one.

19. The embroidery data processing device according to claim 15, wherein said embroidering order changing system moves the embroidering order of the selected area to a last order, and moves up the embroidering orders of the areas of which orders are earlier than the previous order of the selected area by one.

20. The embroidering data processing device according to claim 15, wherein said embroidering order changing system moves up the embroidering order of the selected area by one.

21. The embroidering data processing device according to claim 15, wherein said embroidering order changing system moves down the embroidering order of the selected area by one.

22. The embroidery data processing device according to claim 15, further comprising a data generating system which generates, in accordance with said embroidery data, sewing data to be read by a sewing machine.

* * * * *